United States Patent

[15] 3,647,299

Lavallee

[45] Mar. 7, 1972

[54] OXIMETER

[72] Inventor: Robert G. Lavallee, Ashland, Mass.

[73] Assignee: American Optical Corporation, Southbridge, Mass.

[22] Filed: Apr. 20, 1970

[21] Appl. No.: 29,851

[52] U.S. Cl. .............................. 356/41, 250/209, 250/218, 250/220, 128/2.05, 331/94.5, 313/108 D
[51] Int. Cl. ........................................................ G01n 33/16
[58] Field of Search .............................................. 356/39–42; 250/209, 218, 220; 128/2.0, 2.05; 331/94.5; 317/108 D

[56] References Cited

UNITED STATES PATENTS

| | | | |
|---|---|---|---|
| 3,035,481 | 5/1962 | Jones et al. ............................... | 356/41 |
| 3,241,432 | 3/1966 | Skeggs et al. ............................ | 356/179 |
| 3,455,622 | 7/1969 | Cooper ................................... | 350/96 X |
| 3,531,208 | 9/1970 | Ward ...................................... | 356/176 |
| 3,561,845 | 2/1971 | Boronkay et al. ........................ | 356/97 |

OTHER PUBLICATIONS

Bowen et al., Nuclear Instruments & Methods, Vol. 50, 1967, pp. 349– 350.
Ross, Proc. 13th is a Aerospace Inst. Symp., San Diego, Calif., 1967, pub. by Inst. Soc. of Am. 1967, pp. 489– 502.
Effer, " Industrial Electronics," Jan. 1968, pp. 6– 10.
Lekholm, " Med. & Biol. Engng." Vol. 7, No. 3, May 1969, pp. 333– 335.

Primary Examiner—William L. Sikes
Assistant Examiner—R. J. Webster
Attorney—William C. Nealon, Noble S. Williams, Robert J. Bird and Amster & Rothstein

[57] ABSTRACT

An oximeter having a single light-emitting diode structure capable of emitting the three wavelengths required for oximetry and dye dilution measurements. A ring counter causes three semiconductor chips in the device to be energized in sequence. Light is directed toward the blood sample and the reflected light is extended to three synchronous detectors. Each detector operates only when a corresponding semiconductor chip in the light-emitting diode is energized; each detector thus responds only to the intensity of light at a respective wavelength. The outputs of two of the detectors are extended to a ratio circuit for deriving a final measurement. The ratio circuit itself has a high accuracy over the relatively low dynamic range of the ratio values.

12 Claims, 8 Drawing Figures

PATENTED MAR 7 1972 3,647,299

INVENTOR.
ROBERT G. LAVALLEE

BY Auster & Rothstein

ATTORNEYS

OXIMETER

This invention relates to oximeters, and more particularly to a highly compact and relatively inexpensive instrument.

Oximeters have long been used to measure blood oxygen saturation. The greater the oxygen saturation, the redder are the red blood cells. If red light at a wavelength of 660 millimicrons (mu) is directed toward the blood, the amount of the light reflected depends on how red the blood is, i.e., its oxygen content. The amount of reflected red light increases with the oxygen saturation.

However, it has been recognized that an absolute measurement of the reflected red light is not a true indication of oxygen saturation. This is due to the fact that the oxygen content of the blood sample under test is affected not only by the oxygen saturation, but also by the concentration of the hemoglobin in the blood. For example, even if the red blood cells are one hundred percent saturated with oxygen, the amount of red light reflected may be very small if the concentration of red blood cells in the blood is low. For this reason, for many years the measurement of oxygen concentration has been performed by directing light at two wavelengths toward the blood sample. In addition to the 660-mu light, light at a wavelength of 805 millimicrons is also directed toward the sample (either simultaneously or sequentially with the 660-mu light). The amount of light at the higher wavelength reflected from the sample is dependent upon the concentration of the red blood cells in the sample, but is not affected by the oxygen saturation of these cells. Consequently, the 805-mu reflected light can be used as a reference to prevent the hemoglobin concentration from affecting the oxygen saturation measurement. Instead of reading only the amount of 660-mu light reflected from the sample, the ratio of the 805-mu reflected light to the 660-mu reflected light is measured. The red blood cell concentration affects both the numerator and the denominator of the ratio in the same way and thus does not affect the ratio itself. Thus the measurement is in effect made independent of the concentration of the red blood cells in the blood. Since only the denominator of the ratio is affected by the oxygen concentration, the ratio is an indication of the oxygen concentration.

Oximeters are also generally provided with a capability for performing a dye dilution test. A particular dye (cardiogreen) is injected into the patient. By measuring the dye concentration at various parts of the patient's body, it is possible to determine a considerable amount of information such as cardiac volume and output. In the performance of the dye dilution test, two wavelengths are actually used—910 mu and 805 mu—and it is the ratio of the reflected light at the two wavelengths which is measured. The reflected 805-mu light intensity is inversely proportional to the concentration of the dye in the blood, but this is generally true only under constant flow and turbulence. The amount of 910-mu light reflected is unaffected by the dye but is similarly affected by the blood flow and turbulance. Since considerable fluctuation in the 805-mu reflected light intensity is noted if the catheter used in the test is not in a continuously uniformly flowing stream of blood, the ratio of 805-mu reflected light to 910-mu reflected light is measured because the ratio is virtually unaffected by changes in flow and turbulence. Oximeters are generally provided with the capability of performing both oxygen saturation and dye dilution tests because the same equipment is necessary to perform both tests. The conversion from oximetry to dye measurements may be made without even removing the catheter from the patient. All that is required is to measure a different light ratio in each case.

The major shortcomings of the prior art oximeters are their complexity, cost and size. Typically, a tungsten filament lamp is used as the light source. In order to derive two particular wavelengths (600-mu and 805-mu, or 805-mu and 910-mu), rotating filters have been used. A pair of such filters alternately controls the transmission of the two wavelengths of interest through the fiberoptic catheter. Similarly, the light reflected from the sample must be directed to respective photocells, or alternatively a single photocell can be used if its output is alternately directed to two different circuits whose operations are synchronized to the rotating filter in the transmission path. This kind of mechanical arrangement has given rise to relatively large instruments which are not only costly to maintain, but costly to produce as well.

It is a general object of my invention to provide an oximeter which does not suffer from the aforesaid disadvantages of the prior art instruments.

As described above, both the oximetry and dye dilution tests require the measurement of a ratio. Each light signal is converted to an electrical signal, and a ratio circuit is then used to derive the final output. A typical ratio circuit provides a high degree of accuracy over a large range. However, in oximetry and dye dilution measurements, the dynamic range is relatively small. Conventional ratio circuits do not provide a high degree of accuracy over a small range. Because conventional off-the-shelf ratio circuits have been used in the prior art, they have necessarily affected the accuracy of the instrument measurements.

It is another feature of my invention to provide an improved ratio circuit having a high degree of accuracy over a relatively short range.

One of the major problem areas with prior art oximeters is the derivation of light at three distinct wavelengths. In recent years, light-emitting semiconductor diodes have become available. Semiconductor materials are known for producing light at the three desired wavelengths. However, if three separate light-emitting diodes are utilized as the light sources, not only are three separate devices required, but provision must also be made for coupling the light from each of them to the single catheter used in the in vivo tests.

It is another object of my invention to provide a single light-emitting diode device which is capable of emitting light at three distinct wavelengths and which requires only a single coupling to a fiberoptic bundle.

In accordance with the principles of my invention, the conventional light-emitting diode structure is modified to include three semiconductor light-emitting elements on a common header. One wire is coupled to the common header, and three additional wires are individually connected to each of the semiconductor chips. The overall size of the device is the same as that of a conventional light-emitting diode. By connecting the common wire together with one of the individual wires across an energizing source, it is possible to cause a particular one of the chips to emit its respective wavelength. Thus instead of providing a complex optical system built around a tungsten filament lamp, beam splitters, filters of the proper pass wavelength, mechanical choppers, etc., all that is required in accordance with my invention is a single light-emitting diode structure, the individual semiconductor chips of which are sequentially energized.

Furthermore, to couple the diode structure to the fiberoptic bundle, with the light from all three chips being properly transmitted to the bundle, I have found it possible to utilize a single light pipe which is drawn into a taper. The area of the large end is such that it matches the size of the source to insure that the maximum amount of light is gathered. The exit end area is such that it is compatible with the fiberoptic bundle used to transmit the light to the blood sample. The light pipe can be epoxied to the emitting surfaces of the semiconductor chips; when the exit end of the light pipe is observed, the cross section area of the core glass appears to be a source of light at the wavelength emitted by the particular one of the three semiconductor chips which is energized.

A single photodetector is used to gather the light reflected from the blood sample. The output of the photodetector is amplified and directed to three separate detectors. The same synchronizing circuit which controls the energization of one of the three semiconductor chips in the light-emitting diode also enables a respective one of the three detectors to operate. Consequently, although a single photodetector is used to pick up all three wavelengths reflected from the sample, the only detector which is enabled to operate is that one associated with the particular wavelength of light being transmitted in the first place. This arrangement further cuts down the cost and complexity of the system.

The outputs of the three detectors are coupled to a ratio circuit having two inputs. Depending on the position of a control switch at the input to the ratio circuit, the detector associated with either of the 660-mu or the 910-mu wavelengths is extended to one input of the ratio circuit. The output of the detector associated with the 805-mu light is permanently connected to the other input of the ratio circuit. The ratio circuit provides an output depending on which of the oximetry and dye dilution tests is being performed.

The ratio circuit itself is provided with two amplifiers for processing the two input signals. One amplifier provides an output proportional to the numerator signal of the ratio to be formed and the other amplifier provides an output proportional to the denominator signal of the ratio to be formed. The output of the denominator amplifier energizes a lamp whose light intensity is proportional to the denominator signal. The light emitted from this lamp is coupled to a photodetector in the numerator amplifier in such a manner that the gain of the numerator amplifier is inversely proportional to the output of the denominator amplifier. The output of the numerator amplifier is equal to the product of the numerator input signal and the gain of the amplifier. Since the gain of the amplifier is inversely proportional to the denominator input signal, it is apparent that the output of the numerator amplifier is proportional to the ratio of the two input signals. This ratio circuit is highly accurate over a relatively small dynamic range. Accuracy as high as 0.1 percent over a dynamic range of 2 decades can be achieved.

It is a feature of my invention to provide in an oximeter a single three-wavelength light source which includes an attached light pipe for extending the light emitted from three different semiconductor chips to a single exit area.

It is another feature of my invention to provide in an oximeter a single photodetector circuit coupled to three separate detectors each associated with a respective one of the three different wavelengths, and to synchronize the operations of the three separate detectors with the energizations of the respective semiconductor chips in the single light-emitting diode.

It is another feature of my invention to provide a ratio circuit having two amplifiers to which respective numerator and denominator input signals are applied, the output of the denominator amplifier directly controlling the gain of the numerator amplifier so that the output of the numerator amplifier is proportional to the desired ratio.

Further objects, features, and advantages of my invention will become apparent upon consideration of the following detailed description in conjunction with the drawing, in which.

Figure 1:
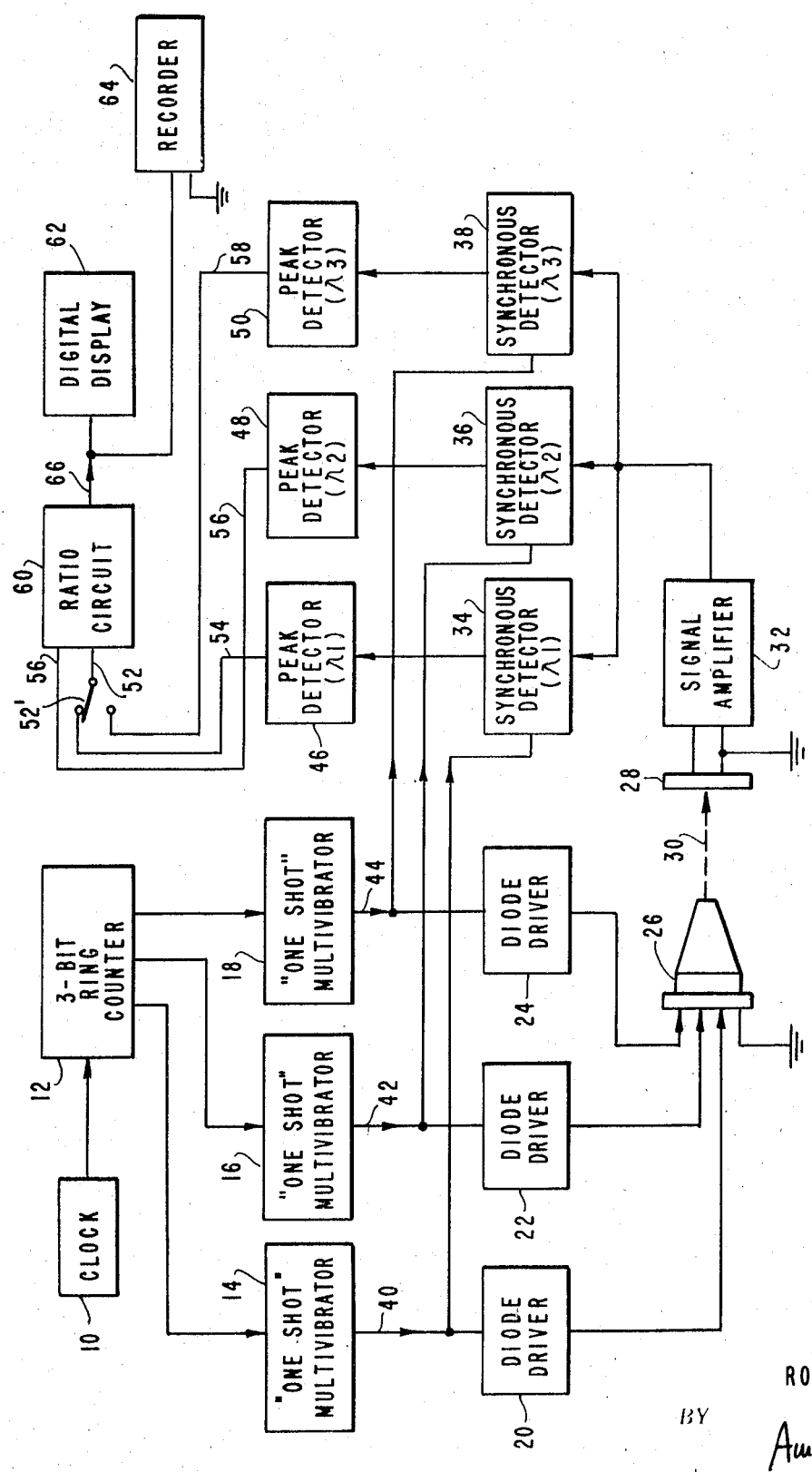
FIG. 1 depicts an illustrative embodiment of the oximeter of my invention.

Referring to FIG. 1, clock 10 applies pulses to the input of three-bit ring counter 12 at a rate of 3 kHz. The three outputs of the ring counter are extended to respective one-shot multivibrators 14, 16 and 18. The multivibrators are triggered in succession. Each time a multivibrator is triggered, a pulse appears on the corresponding output conductor 40, 42 and 44. The pulse on each of the output conductors has a duration of approximately 75 microseconds and is extended to the input of a respective one of diode drivers, 20, 22 and 24. The output of each driver is connected to a respective one of the inputs of light-emitting diode 26. The fourth input of the diode is grounded. When any diode driver is energized, as will be described below, light of a respective wavelength is emitted from the diode as shown by arrow 30.

The emitted light is extended to the blood sample, as will be described below with reference to FIGS. 2 and 3. The light reflected from the sample is coupled to photodetector 28. The output of the photodetector is coupled to signal amplifier 32, whose output is in turn extended to the input of each of synchronous detectors 34, 36 and 38. Each of these detectors is capable of amplifying the continuous output signal from amplifier 32. However, each of the multivibrator output conductors 40, 42 and 44 is connected to the enabling input of a respective one of the synchronous detectors. Consequently, each synchronous detector is enabled for operation only during that portion of each cycle that the respective wavelength is being emitted from the light-emitting diode. The synchronizing circuit (including ring counter 12 and the three multivibrators) thus causes a single one of the diode drivers to operate together with a respective one of the synchronous detectors at any given time, the three pairs of diode drivers and detectors operating sequentially.

The output from each synchronous detector is extended to a respective one of peak detectors 46, 48 and 50. Each peak detector develops on a respective output conductor 54, 56 and 58 a voltage which is proportional to the peak level at the output of the respective synchronous detector. As in a conventional peak detector, each output follows the peaks of the inputs; in effect, the output of a peak detector is proportional to the average peak input over a number of cycles.

Diode driver 22, synchronous detector 36 and peak detector 48 are used to generate and detect the 810-mu light used in the system. The signal on conductor 56 is extended to one input of ratio circuit 60. This signal always forms the numerator of the ratio determined by the ratio circuit no matter which of the two tests is performed.

Diode driver 20, synchronous detector 34 and peak detector 46 are used to generate and detect the 660-mu light. If switch 52' is connected to conductor 54 as shown in the drawing, the signal on conductor 52 corresponds to the intensity of the detected 660-mu light. The signal on conductor 66 at the output of ratio circuit 60 is in such a case proportional to the ratio of the intensity of the reflected 805-mu light to the intensity of the reflected 660-mu light. Similarly, diode driver 24, synchronous detector 38 and peak detector 50 are used to generate and detect the 910-mu light. If switch 52' is moved to couple conductor 58 to conductor 52, the output of the ratio circuit is proportional to the ratio of the intensity of the 805-mu reflected light to the intensity of the 910-mu reflected light.

The output of the ratio circuit is coupled to both digital display 62 and recorder 64 which can be of any conventional types in order to respectively display and record the test data.

Figure 2:
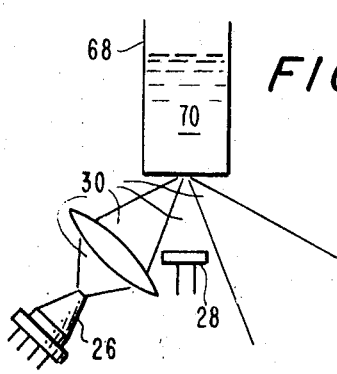
FIGS. 2 and 3 illustrate respectively the manner in which the oximeter of my invention can be utilized to perform in vitro and in vivo tests.

FIG. 2 illustrates how the instrument can be utilized in the conduct of an in vitro oximetry test. Blood sample 70 is contained in cuvette 68. Light from light-emitting diode 26 is focused by lens 47 at the bottom of the sample and is reflected as shown by light ray 30 (corresponding to dotted line 30 in FIG. 1). Detector 28 is placed below the cuvette out of the main path of the light rays. The detector is not placed so that it intercepts the main beam after it is reflected from the sample. This is because the main beam contains not only the light scattered in that direction by the blood, but also a very large component of light specularly reflected from the cuvette surfaces. Instead, the detector picks up the light which is scattered by the sample. This particular arrangement is standard in the art.

Figure 3:
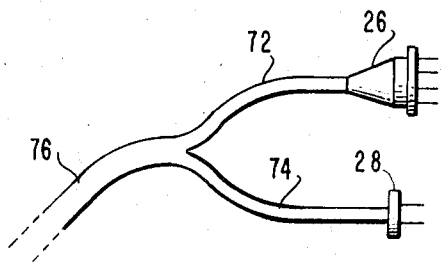

FIG. 3 shows the arrangement for performing in vivo oximetry and dye dilution measurements, the arrangement of fibers also being standard in the art. Light-emitting diode 26 is coupled to fiberoptic bundle 72, which in turn is extended to catheter (fiberoptic bundle) 76. Light transmitted through the catheter is reflected from the blood in the vicinity of the catheter tip and returned along another fiberoptic bundle 74 which is coupled to photodetector 28. The particular manner in which the light from the light-emitting diode is coupled to the sample, and the manner in which the reflected light is detected, do not comprise a part of my invention, except insofar as the interface of the light-emitting diode and the fiberoptic bundle 72 are concerned, as will be described below.

Figure 4A:
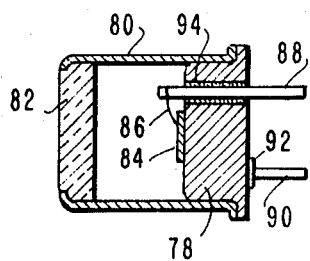
FIGS. 4A and 4B illustrate a conventional light-emitting diode.
Figure 4B:
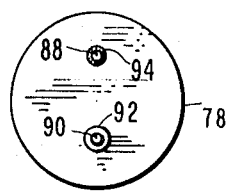

FIGS. 4A and 4B illustrate a conventional light-emitting diode, FIG. 4A being a cross-sectional view through the diode structure and FIG. 4B being an end view. The device includes an electrically conductive header 78 on the top of which a can 80 is mounted. A first wire 90 is connected in any conventional manner, as shown at 92, to the bottom of the header. A second wire 88 is extended through the header to the interior of the can. Wire 88 is held in place by insulative material 94 so that it does not make electrical contact with the header. A semiconductor chip 84 is mounted to the header inside the can and connected by wire 86 to wire 88. When a current flows between wires 88 and 90, light is emitted from the semiconductor chip. At the front of the can is a lens 82 for focusing the light emitted from the semiconductor chip. The semiconductor chip itself is placed at the center of the header so that the light emitted from it is directed axially through lens 82.

Figure 5A:
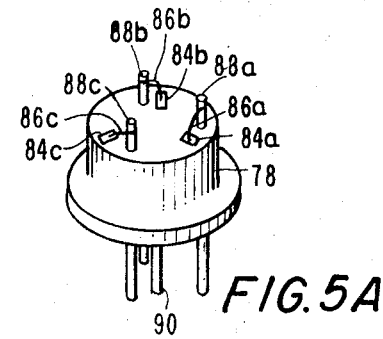
FIGS. 5A and 5B illustrate the light-emitting diode of my invention which is capable of emitting light at three different wavelengths at a single exit area.
Figure 5B:
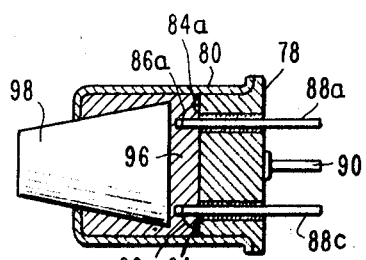

The light-emitting diode of my invention is shown in cross section in FIG. 5B, while FIG. 5A shows the header itself. A wire 90 is connected to the bottom of the header as it is in the conventional light-emitting diode. (Wire 90 is connected at the center of the header in the illustrative embodiment of the three-wavelength light-emitting diode of my invention). But instead of providing only a single wire 88 extending through the header, three such wires 88a, 88b and 88c are provided, each wire being held in place by insulative material just as is wire 88 in FIG. 4A. At the top of the header are three semiconductor chips, 84a, 84b and 84c, each for emitting light at a respective one of the 660-mu, 805-mu and 910-mu wavelengths. A separate one of wires 86a, 86b and 86c connects each semiconductor chip to a respective one of wires 88a, 88b and 88 c. For controlling the emission of light from only one of the semiconductor chips, conductor 90 and the respective one of conductors 88a, 88b and 88c are connected across an energizing source.

Since none of the three chips is centered on the header, it would appear that it would be difficult to direct the light from any chip out of the device in the axial direction (which, in turn, would make it exceedingly difficulty to couple the device to a fiberoptic bundle and yet transmit light of sufficient intensity at all wavelengths along the bundle). However, I have found that it is possible to provide a satisfactory three-wavelength light-emitting device by tapering a light pipe 98 as shown in FIG. 5B and mounting it within can 80. The can can be filled with optical quality epoxy 96 for securing the tapered glass or plastic in place. The area of the large end is large enough to cover all three semiconductor chips. The area of the smaller end is made compatible with the rest of the system. For example, if the light is to be transmitted along a fiberoptic bundle, the smaller end should be made to have the same diameter as the bundle. Of course, the face of the smaller end of the light pipe 98 should be ground and polished to an optical flat for the best possible coupling of the emitted light to the fiberoptic bundle. The light pipe may be clad as is known in the art.

When the light-emitting diode of FIGS. 5A and 5B is used in the system of FIG. 1, conductor 90 is grounded and each of conductors 88a, 88b and 88c is connected to the output of a respective one of diode drivers 20, 22 and 24. As the diode drivers are energized in succession, light pulses at the three different wavelengths are similarly emitted in succession. Of course, depending on which of the two tests is being performed, the output from one of peak detectors 46 or 50 is not used. While it is possible to enable only two of the diode drivers during the performance of either test, there is not need to provide additional circuitry for this purpose since there is no harm in generating and detecting light at the unused wavelength.

Figure 6:
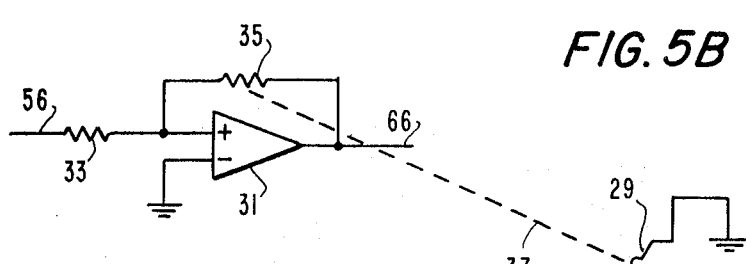
FIG. 6 depicts the ratio circuit of my invention which is used in the system of FIG. 1.

The ratio circuit itself is shown in FIG. 6. The signal representing the denominator of the ratio to be measured appears on conductor 52 and the signal representing the numerator of the ratio to be measured appears on conductor 56. One input of amplifier 31 is grounded and the other input is connected to the input conductor 56 through resistor 33. The output of the amplifier on conductor 66 is fed back through element 35 to the signal input. As is known in the art, the gain of the operational amplifier is equal to the ratio of the impedance of element 35 to the impedance of element 33. Element 35 is a photodetector whose impedance decreases with increased light detected from lamp 29. The intensity of the light generated by lamp 29 is proportional to the denominator signal on conductor 52. Consequently, as the denominator increases, the gain of the numerator amplifier 31 decreases and the output on conductor 66 similarly decreases. The output is proportional to both the numerator and the inverse of the denominator; the numerator signal directly affects the output on conductor 66 while the denominator signal affects the gain of the numerator amplifier.

The negative input of operational amplifier 25 is connected through a very large magnitude resistor 23 to ground and similarly a very large magnitude resistor 27 is used in the feedback circuit. Resistors 17 and 21 are equal in magnitude and resistor 21 is connected to a variable battery 19. The battery is used only for calibration purpose. The output of operational amplifier 13 is fed back through photodetector 15 to the positive input of the amplifier, which is also coupled through resistor 11 to input conductor 52. The gain at the output of amplifier 13 is equal to the ratio of the magnitude of the impedance of photodetector 15 to the magnitude of impedance 11. Because resistors 17 and 21 are equal in magnitude, the system operates to maintain the potential of the output of amplifier 13 equal to the potential of battery 19. If the signal on conductor 52 increases, this would ordinarily tend to increase the signal at the output of amplifier 13. This, in turn, causes the potential at the output of amplifier 25 to increase and for the light emitted from lamp 29 to increase. This light is directed, as shown by dotted lines 37, not only to photodetector 35 but also to photodetector 15. As the impedance of photodetector 15 decreases with the increased light output, the output of amplifier 13 decreases. The net result is that there is a servo loop including amplifiers 13 and 25, and lamp 29, such that the output of amplifier 13 is kept equal to the potential of battery 19, while the intensity of the light output from lamp 29 is directly proportional to the input signal on conductor 52. As described above, since the light intensity causes the gain of amplifier 31 to vary in an inverse manner, the output signal on conductor 66 is proportional to the desired ratio.

It is possible to achieve very high frequency responses with the ratio circuit of FIG. 6 if lamp 29 is in fact a light-emitting diode (which has a much higher frequency response than a tungsten filament lamp, for example). But the major advantage of the ratio circuit of FIG. 6, at least insofar as the oximeter of my invention is concerned, is that the output signal is very accurate over a relatively small dynamic range of input—the case in an oximeter.

Although the invention has been described with reference to a particular embodiment, it is to be understood that this embodiment is merely illustrative of the application of the principles of the invention. For example, the system of FIG. 1 can be used in the design of an ear oximeter; the "ratio" circuit can be used as a multiplier if photodetector 35 increases in impedance with an increase in light intensity. Thus it is to be understood that numerous modifications may be made in the illustrative embodiment of the invention and other arrangements may be devised without departing from the spirit and scope of the invention.

What I claim is:

1. An oximeter system comprising light-emitting diode means for selectively emitting light at three wavelengths required to perform oximetry and dye dilution tests, means for sequentially controlling the emission of light at said three wavelengths from said light-emitting diode means, means for directing the light emitted from said light-emitting diode to a blood sample, first, second, and third means for detecting the intensity of the light scattered from said blood sample and for generating respective output signals, means for enabling the operation of each of said first, second, and third detecting means at the same time that a respective one of the light wavelengths is emitted from said light-emitting diode means, means responsive to the operation of said first, second, and third means for deriving a signal which is proportional to the ratio of the output signals generated by a selected two of said first, second and third detecting means, said signal deriving means including an amplifier, means for applying the output signal of said second detecting means to the input of said amplifier, means for varying the gain of said amplifier inversely with the output signal generated by a selected one of said first and third detecting means, and means for utilizing the signal at the output of said amplifier.

2. An oximeter system in accordance with claim 1 wherein said light-emitting diode means includes a header, a first wire electrically connected to said header, three semiconductor chips mounted on said header each capable of emitting light at a different one of said three wavelengths when energized, and three wires each connected to a respective one of said semiconductor chips.

3. An oximeter system in accordance with claim 2 wherein said light-emitting diode means further includes a tapered light pipe mounted to extend outwardly from said semiconductor chips, the larger diameter end of said light pipe being disposed adjacent to said semiconductor chips.

4. An oximeter system in accordance with claim 3 wherein each of said three wires in said light-emitting diode means is extended through said header and further including insulative means mounted in said header for separating each of said three wires from said header, and optical-quality epoxy around said light pipe, and between said light pipe and said semiconductor chips and header.

5. An oximeter system in accordance with claim 1 wherein said gain-varying means includes a photodetector means whose impedance varies with the intensity of the light detected thereby and which controls the gain of said amplifier, light source means separate from said light detector means for illuminating said photodetector means, said light source means being operatively optically coupled to said photodetector means only, and means for controlling the intensity of the light emitted by said light source means in accordance with the selected one of the output signals of said first and third detecting means.

6. An oximeter system in accordance with claim 1 wherein said gain-varying means includes photodetector means whose impedance varies with the intensity of the light detected thereby and which controls the gain of said amplifier, light source means for illuminating said photodetector means, and means for controlling the intensity of the light emitted by said light source means in accordance with the selected one of the output signals of said first and third detecting means.

7. An oximeter system comprising light-emitting diode means for selectively emitting light at at least two wavelengths, means for sequentially controlling the intensity of the emission of light at said at least two wavelengths from said light-emitting diode means, means for directing the light emitted from said light-emitting diode means to a blood sample, at least two means for detecting the intensity of the light scattered from said blood sample and for generating respective output signals, means for enabling the operation of each of said at least two detecting means at the same time that a respective one of the light wavelengths is emitted from said light-emitting diode means, means responsive to the operation of said at least two means for deriving a signal which is proportional to the ratio of the output signals generated by two of said detecting means, said signal deriving means including an amplifier, means for applying the output signal of said one detecting means to the input of said amplifier, means for varying the gain of said amplifier inversely with the output signal generated by another one of said detecting means, and means for utilizing the signal at the output of said amplifier.

8. An oximeter system in accordance with claim 7 wherein said light-emitting diode means includes a header, a first wire electrically connected to said header, at least two semiconductor chips mounted on said header each capable of emitting light at a different one of said at least two wavelengths when energized, and at least two wires each connected to a respective one of said semiconductor chips.

9. An oximeter system in accordance with claim 8 wherein said light-emitting diode means further includes a tapered light pipe mounted to extend outwardly from said semiconductor chips, the larger diameter end of said light pipe being disposed adjacent to said semiconductor chips.

10. An oximeter system in accordance with claim 9 wherein each of said at least two wires in said light-emitting diode means is extended through said header and further including insulative means mounted in said header for separating each of said at least two wires from said header, and optical-quality epoxy around said light pipe, and between said light pipe and said semiconductor chips and header.

11. An oximeter system in accordance with claim 7 wherein said gain-varying means includes photodetector means whose impedance varies with the intensity of the light detected thereby and which controls the gain of said amplifier, light source means separate from said light detector means for illuminating said photodetector means, said light source means being operatively optically coupled to said photodetector means only, and means for controlling the intensity of the light emitted by said light source means in accordance with the output signal of said other one of said detecting means.

12. An oximeter system in accordance with claim 7 wherein said gain-varying means includes photodetector means whose impedance varies with the intensity of the light detected thereby and which controls the gain of said amplifier, light source means for illuminating said photodetector, and means for controlling the intensity of the light emitted by said light source means in accordance with the output signal of said other one of said detecting means.

* * * * *